US005986009A

United States Patent [19]
Thoen et al.

[11] Patent Number: 5,986,009
[45] Date of Patent: Nov. 16, 1999

[54] BLENDS OF POLYPROPYLENES

[75] Inventors: Johan A. Thoen, HB-Terneuzen, Netherlands; Patricia Ansems, West Columbia, Tex.; Rudolf J. Koopmans, Kruibeke, Belgium

[73] Assignee: The Dow Chemical Company, Midland, Mich.

[21] Appl. No.: 09/198,325

[22] Filed: Nov. 23, 1998

Related U.S. Application Data

[60] Provisional application No. 60/067,791, Dec. 3, 1997.

[51] Int. Cl.$^6$ .............................. C08L 23/12; C08L 23/14
[52] U.S. Cl. ......................... 525/240; 525/240; 525/241; 525/323; 260/897
[58] Field of Search .................................... 525/240, 303, 525/323

[56] References Cited

U.S. PATENT DOCUMENTS

| | | | |
|---|---|---|---|
| 4,022,728 | 5/1977 | Trotter et al. | 260/27 R |
| 4,120,916 | 10/1978 | Meyer, Jr. et al. | 260/897 |
| 5,414,027 | 5/1995 | DeNicola et al. | 522/112 |
| 5,464,907 | 11/1995 | Lelenic et al. | 525/303 |
| 5,516,848 | 5/1996 | Ganich et al. | 525/240 |
| 5,539,056 | 7/1996 | Yang et al. | |
| 5,686,533 | 11/1997 | Gahleitner et al. | 525/240 |

FOREIGN PATENT DOCUMENTS

| | | |
|---|---|---|
| 98/42780 | 1/1998 | WIPO . |

OTHER PUBLICATIONS

Seymour, R. et.al. "Polymer Chemistry", second edition, Marcel Dekker, INc, pp. 74–75, 1987.

Whelan, T "Polymer Technology Dictionary", Chapman & Hall, first edition, pp. 312, 91, 1994.

Billme yer F., "Textbook of Polymer Chemistry", third edition, John Willey & Sons, pp. 242, 243, 307, 1984.

*Primary Examiner*—Bernard Lipman
*Assistant Examiner*—Tanya Zalukaeva

[57] ABSTRACT

The invention includes a blend composition comprising (a) about 1 to about 15 weight percent of amorphous polypropylene (b) about 99 to about 85 weight percent of crystalline polypropylene, wherein the molecular weight of the amorphous polypropylene is lower than the molecular weight of the crystalline polypropylene; the molecular weight (Mw) of the amorphous polypropylene is higher than about 50,000, preferably 100,000 g/mole; the amorphous polypropylene has a MWD less than about 3; and wherein the percentages are based on total amorphous plus crystalline polypropylene. Preferably, amorphous and crystalline polypropylenes are at least about 90 weight percent propylene units. Preferably, the amorphous polypropylene has a glass transition temperature greater than about −10° C. The invention includes processes for preparing compositions of the invention, including a multistage process. Additionally the invention includes articles, sheets, films, foams and fibers comprising or prepared from compositions of the invention as well as processes for making the things, preferably processes involving stretching a composition of the invention. The processes include a process comprising, extrusion or injection blow molding; extruding, or thermoforming a composition of the invention; as well as a process comprising reacting a composition of the invention with a coupling agent.

20 Claims, No Drawings

BLENDS OF POLYPROPYLENES

This application claims the benefit of U.S. Provisional Application No. 60/067,791, filed Dec. 3, 1997.

This invention relates to polypropylene, more particularly to blends of polymers having repeating units derived from propylene.

BACKGROUND OF THE INVENTION

Amorphous polypropylene is well known in the art. The term amorphous refers to the substantial absence of crystallinity in the polymer; for polypropylene homopolymer this means that the polymer is atactic, without any isotactic segments giving rise to crystallinity, as can be determined by the absence of a melting point and a heat of fusion of less than 10 J/g in DSC. Atactic polymers are defined as having no consistent patterns among chiral sequences [Mark H., Bikales N., Encyclopedia of Polymer Science and Engineering, Volume 9, John Wiley & Sons Inc, 1987, page 800] as can be determined by $^{13}C$ NMR [Karger-Kocsis J., Polypropylene, Structure blends and composites, 1. Structure and Morphology, Chapman & Hall, 1995, pages15–19]. It is, for instance, formed as a by-product of the production of isotactic polypropylene using Ziegler-Natta catalysis. This amorphous polypropylene fraction is generally of low molecular weight (wax) with a broad molecular weight distribution, and as such either used in e.g. adhesives applications or discarded as landfill. Although these polymers have been referred to as "amorphous", they often are not completely atactic; rather they contain some isotactic segments.

Amorphous polyolefins, such as the amorphous polypropylene produced using Ziegler-Natta catalysis, have been used in blends with crystalline isotactic polypropylene to improve the flexibility of mechanically strong isotactic polypropylene. Patent document EP 527589 teaches the production of a blend of (a) 20–80 percent by weight of an amorphous polyolefin having a propylene and/or butene-1 component content of 50 percent by weight or more, and (b) 80–20 percent by weight of a crystalline polypropylene. These blends are claimed to be well balanced in mechanical strength and flexibility. However, amorphous polypropylenes produced by Ziegler-Natta catalysis reduce the overall mechanical strength of a blend of amorphous polypropylene and crystalline polypropylene.

Production of high molecular weight amorphous atactic polypropylene with a narrow molecular weight distribution is taught in the art to be attainable by using single site catalysts. Patent documents EP 604917 and EP 604908 teach the synthesis of amorphous polypropylene polymers which are claimed to have interesting elastomeric properties. The characteristics of the polymers, according to EP 604917 are: intrinsic viscosity>1 dl/g, percent (r) minus (−) percent (m)>0 wherein percent (r) is the percent of syndiotactic diads and percent (m) is the percent of isotactic diads, less than 2 percent of the $CH_2$ groups contained in sequences $(CH_2)_n$ with $n \geq 2$, Bernoullianity index $B=1\pm0.2$, and a narrow molecular weight distribution.

Patent documents WO 96/23838, U.S. Pat. No. 5,539,056 and U.S. Pat. No. 5,516,848 teach the production of a blend of an amorphous poly-α-olefin of molecular weight (Mw) at least about 150,000 (produced using single site catalysis) and a crystalline poly- -olefin with Mw less than 300,000, (produced using single site catalysis) in which the molecular weight of the amorphous polypropylene is greater than the molecular weight of the crystalline polypropylene. The preferred blends comprise about 10 to about 90 weight percent of amorphous polypropylene. These blends are claimed to exhibit unusual elastomeric properties, namely an improved balance of mechanical strength and rubber recovery properties.

Patent document U.S. Pat. No. 5,483,002 and Patent Document EP 643 100 teach the production of a blend of a semi-crystalline propylene homopolymer having a melting point of 125 to 165° C. and a semi-crystalline propylene homopolymer having a melting point below 130° C. or a non-crystallizing propylene homopolymer having a glass transition temperature which is less than or equal to −10° C. These blends are claimed to have improved mechanical properties, notably impact strength.

Crystalline polypropylene is used in many film or sheet forming processes, such as biaxially oriented PP production, blow molding and thermoforming. In these processes achieving the desired degree of stretching and orientation in the film or sheet is a problem. Stretching must occur between the moment the film or sheet leaves the die as a melt and the time the melt has cooled to a complete solid. Achieving a stable running process, in which the film or sheet production is not limited by breakage or rupturing of the film or sheet is also a problem.

SUMMARY OF THE INVENTION

The invention includes a blend composition comprising (a) from about 1 to about 15 weight percent of amorphous polypropylene (b) from about 99 to about 85 weight percent of crystalline polypropylene, wherein the molecular weight of the amorphous polypropylene is lower than the molecular weight of the crystalline polypropylene; the molecular weight (Mw) of the amorphous polypropylene is higher than about 50,000, preferably 100,000 g/mole; the amorphous polypropylene has a MWD less than about 3; and wherein the percentages are based on total amorphous plus crystalline polypropylene. Preferably, amorphous and crystalline polypropylenes are preferably at least about 90 weight percent propylene units. Preferably, the amorphous polypropylene has a glass transition temperature greater than about −10° C. Optionally at least one of the crystalline polypropylene or amorphous polypropylene is propylene polymerized with one or more other monomers addition polymerizable with propylene, which monomer is preferably a polyene, preferably having at least 7 carbon atoms. In one embodiment, both the amorphous and the crystalline polypropylenes are prepared using a single site catalyst. Either of the polypropylenes or the blend is optionally, and the amorphous polypropylene is preferably branched or coupled.

The invention also includes processes for preparing compositions of the invention, including a multistage process comprising out in two or more stages, in each of which polymerization occurs and which stages differ from one another in that at least one polymerization results in the crystalline polypropylene component, and at least one stage or polymerization results in the amorphous polypropylene component of the composition.

Additionally the invention includes articles, sheets, films, foams and fibers comprising or prepared from compositions of the invention as well as processes for making the things, preferably processes involving stretching a composition of the invention. The processes include a process comprising blow molding, extruding, extrusion blow molding, injection blow molding or thermoforming a composition of the invention; as well as a process comprising reacting a composition of the invention with a coupling agent.

A film of the invention preferably exhibits at least one of reduced crystallization rate of the blend, reduced stress during stretching, fewer breaks of the film during the stretching process, higher crystallinity in the final film as compared with a film formed from the crystalline polypropylene blended with the same amount of an amorphous polypropylene which was prepared using Ziegler-Natta catalysis. An amorphous polypropylene prepared using Ziegler Natta catalysis would be expected to have a typical molecular weight of 30000 g/mole and residual crystallinity of typically about 10–15 percent of the theoretical maximum crystallization as determined by DSC (actual heat of fusion/ 165 J/g) and greater tear strength or lower final stress in the film as compared with a film formed from the crystalline polypropylene blended with the same amount of an amorphous polypropylene which was prepared using Ziegler-Natta catalysis and has a molecular weight of 30000 g/mole and has residual crystallinity, of 10–15 percent.

In film forming processes, the presence of amorphous polypropylene with a narrow molecular weight distribution influences the crystallization process, and reduces the crystallization rate of the crystalline polypropylene. This results in lower stresses necessary for the stretching operation, leading to a more stable process without breakage or rupturing of the film or sheet, and lower shrinkage of the final product. Also higher orientation levels can be achieved. The mechanical and optical properties of the film or sheet are maintained through the presence of amorphous polypropylene that is advantageously of high molecular weight (Mw greater than about 50,000, preferably 100,000 g/mole), which amorphous polypropylene also advantageously influences the crystallization process with the result that the final crystallinity of the blend is higher as compared to a blend of crystalline polypropylene and Ziegler-Natta catalyst based amorphous polypropylene. However, if the molecular weight of the polypropylene is too high (higher than the molecular weight of the crystalline polypropylene), diffusion rates of the amorphous polypropylene would limit the film or sheet forming process.

This invention differs from prior art blends in having mechanical strength from the use of amorphous polypropylene of molecular weight greater than about 50,000, preferably 100,000 g/mole, advantageously having better mechanical properties including tear strength due to the narrower molecular weight distribution as well as the higher final crystallinity benefit of reduction in crystallization rate of the crystalline PP believed to be from the use of lower molecular weight amorphous polypropylene than isotactic polypropylene.

DETAILED DESCRIPTION OF THE INVENTION

Blends of the invention comprise at least one crystalline polypropylene. A crystalline polypropylene is a polymer with at least about 90 mole percent of its repeating units derived from propylene, preferably at least about 97 percent, more preferably at least about 99 percent. The term "crystalline" is used herein to mean isotactic polypropylene having at least about 93 percent isotactic triads as measured by $^{13}C$ NMR, preferably at least about 95 percent, more preferably at least about 96 percent.

The crystalline polypropylene comprises either homopolypropylene or propylene polymerized with one or more other monomers addition polymerizable with propylene. The other monomers are preferably olefins, more preferably alpha olefins, most preferably ethylene or an olefin having a structure $RCH=CH_2$ where R is aliphatic or aromatic and has at least two and preferably less than about 18 carbon atoms. Hydrocarbon olefin monomers within the skill in the art, include hydrocarbons having one or more double bonds at least one of which is polymerizable with the alpha olefin monomer.

Alpha olefins having more than 3 carbon atoms include 1-butene, 1-pentene, 1-hexene, 1-octene, 1-noneane, 1-decene, 1-unidecene, 1-dodecene and the like as well as 4-methyl-1-pentene, 4-methyl-1-hexeane, 5-methyl-1-hexeane, vinylcyclohexane, styrene and the like. The preferred alpha olefins include ethylene, butene-1, hexene-1, and octene-1.

Optionally, but not in the most preferred embodiment, the polymers have monomers having at least two double bonds which are preferably dienes or trienes. Suitable diene and triene comonomers include 7-methyl-1,6-octadiene, 3,7-dimethyl-1,6-octadiene, 5,7-dimethyl-1,6-octadiene, 3,7,11-trimethyl-1,6,10-octatriene, 6-methyl-1,5-heptadiene, 1,3-butadiene, 1,6-heptadiene, 1,7-octadiene, 1,8-nonadiene, 1,9-decadiene, 1,10-undecadiene, norbornene, tetracyclododecene, or mixtures thereof, preferably butadiene, hexadienes, and octadienes, most preferably 1,4-hexadiene, 1,9-decadiene, 4-methyl-1,4-hexadiene, 5-methyl-1,4-hexadiene, dicyclopentadiene, and 5-ethylidene-2-norbornene.

Crystalline polypropylenes are formed by means within the skill in the art, e.g. using single site catalysts or Ziegler Natta catalysts. The propylene and optionally alpha olefin monomers are polymerized under conditions within the skill in the art, for instance as disclosed by Galli, et al., *Angew. Macromol. Chem.*, Vol. 120, p. 73 (1984), or by E. P. Moore, et al. in *Polypropylene Handbook,* Hanser Publishers, New York, 1996, particularly pages 11–98.

The crystalline polypropylene starting materials are suitably of any molecular weight distribution (MWD). Polymers of broad or narrow MWD are formed by means within the skill in the art. For fiber applications generally a narrower MWD is preferred (e.g. less than about 3), for BOPP (biaxially oriented polypropylene) applications a broader MWD is preferred (e.g. greater than about 5). When a narrow MWD is preferred, it is advantageously obtained using single site catalysis.

The crystalline polypropylene has a weight average molecular weight as measured by gel permeation chromatography (GPC) greater than about 100,000, preferably greater than about 115,000, more preferably greater than about 150,000, most preferably greater than about 250,000 to obtain desirably high mechanical strength in the final product, e.g. sufficient mechanical strength to avoid breaking in film forming or thermoforming.

The other component in blends of the invention is an amorphous polypropylene which, like the crystalline polypropylene, is a propylene homopolymer or copolymer, optionally containing up to about 10 mole percent other comonomer copolymerizable with propylene. The amorphous polypropylene is advantageously at least about 90 mole percent propylene, preferably at least about 95 percent, more preferably at least about 99 percent. Suitable and preferred comonomers are the same as described for the crystalline polypropylene. The term amorphous refers to the absence of crystallinity in the polymer; for polypropylene homopolymer this means that the polymer is atactic, without sufficient isotactic segments to give rise to crystallinity, as can be determined by the absence of a melting point and a heat of fusion of 0 J/g in DSC. Atactic polymers are defined as having no consistent patterns among chiral sequences [Mark H., Bikales N., Encyclopedia of Polymer Science and Engineering, Volume 9, John Wiley & Sons Inc, 1987, page 800] as can be determined by $^{13}$C NMR [Karger-Kocsis J., Polypropylene, Structure blends and composites, 1. Structure and Morphology, Chapman & Hall, 1995, pages15–19].

The amorphous polypropylene has a weight average molecular weight (Mw) greater than about 50,000, advantageously greater than about 100,000, more preferably greater than about 130,000, most preferably greater than about 150,000 g/mole to obtain sufficient mechanical strength in the final blend to be suitable for film formation, and/or thermoformiing processes. Suitability is indicated by fewer breaks per unit of film, or article than would occur with a blend of the same crystalline polymer and an amorphous polypropylene which was prepared using Ziegler-Natta catalysis and has a molecular weight of 30000 g/mole and has residual crystallinity of about 10–15 percent of theoretical as discussed hereinbefore.

Further, the amorphous polypropylene has a weight average molecular weight (Mw) less than that of the crystalline polypropylene to achieve sufficient diffusion rate of the amorphous phase to result in crystallization of the blend advantageously with lower stress during stretch than a blend with the same crystalline polypropylene and an amorphous polypropylene having a molecular weight greater than that of the crystalline polymer. The amorphous polypropylene preferably has a weight average molecular weight of at least about 10 percent, more preferably at least about 15 percent, most preferably at least about 20 percent lower than that of the crystalline polypropylene. In many instances, the Mw of the amorphous polypropylene is preferably at least about 50,000, more preferably at least about 100,000, most preferably at least about 150,000 g/mole less than that of the crystalline polypropylene.

The amorphous polypropylene starting materials preferably have a narrow molecular weight distribution (MWD), that is a MWD of less than about 5, preferably less than about 3, more preferably less than about 2. When the molecular weight distribution is greater than about 3 it is preferably bimodal such as is obtainable by blending two such high molecular weight amorphous polymers. The MWD is measured by GPC analysis (Mw/Mn). The preferred narrow MWD is advantageously obtained using single site catalysis. Preparing such narrow molecular weight amorphous polypropylene is within the skill in the art such as is described for instance as disclosed by Galli, et al., *Angew. Macromol. Chem.,* Vol. 120, p. 73 (1984), or by E. P. Moore, et al. in *Polypropylene Handbook,* Hanser Publishers, New York, 1996, particularly pages 11–98. The term single site catalysts is recognized in the art as referring to catalysts which have less diversity in the individual polymer chains produced than is observed in polymers made using Ziegler Natta catalysts. This diversity is evidenced in broader MWD. Single site catalysts include single site metallocene or single site constrained geometry catalyst; these are exemplified by U.S. Pat. No. 4,937,299 (Ewen et al.), U.S. Pat. No. 5,218,071 (Tsutsui et al.), U.S. Pat. Nos. 5,278,272, 5,324,800, 5,084,534, 5,405,922, 4,588,794, 5,204,419.

To maintain desirable mechanical properties such as tensile modulus of the blend, the amorphous polypropylene preferably has a glass transition temperature (Tg) greater than about –10° C. Again, desired mechanical properties are those compared with a blend of the same crystalline polypropylene and an amorphous polypropylene of Tg less than about –10° C. and preferably include resistance to break during thermal forming and/or tensile modulus.

All references herein to elements or metals belonging to a certain Group refer to the Periodic Table of the Elements published and copyrighted by CRC Press, Inc., 1989. Also any reference to the Group or Groups shall be to the Group or Groups as reflected in this Periodic Table of the Elements using the IUPAC system for numbering groups.

Preparation of crystalline and amorphous polypropylene polymers is well within the skill in the art. Advantageous catalysts for use in preparing narrow molecular weight distribution polymers useful in the practice of the invention, especially for the amorphous polypropylene, are preferably derivatives of any transition metal including Lanthanides, but preferably of Group 3, 4, or Lanthanide metals which are in the +2, +3, or +4 formal oxidation state. Preferred compounds include metal complexes containing from 1 to 3 π-bonded anionic or neutral ligand groups, which are optionally cyclic or non-cyclic delocalized π-bonded anionic ligand groups. Exemplary of such π-bonded anionic ligand groups are conjugated or nonconjugated, cyclic or non-cyclic dienyl groups, and allyl groups. By the term "π-bonded" is meant that the ligand group is bonded to the transition metal by means of its delocalized π-electrons.

Each atom in the delocalized π-bonded group is optionally independently substituted with a radical selected from the group consisting of hydrogen, halogen, hydrocarbyl, halohydrocarbyl, hydrocarbyl-substituted metalloid radicals wherein the metalloid is selected from Group 14 of the Periodic Table of the Elements, and such hydrocarbyl- or hydrocarbyl-substituted metalloid radicals further substituted with a Group 15 or 16 hetero atom containing moiety. Included within the term "hydrocarbyl" are $C_{1-20}$ straight, branched and cyclic alkyl radicals, $C_{6-20}$ aromatic radicals, $C_{7-20}$ alkyl-substituted aromatic radicals, and $C_{7-20}$ aryl-substituted alkyl radicals. In addition two or more such adjacent radicals may together form a fused ring system, a hydrogenated fused ring system, or a metallocycle with the metal. Suitable hydrocarbyl-substituted organometalloid radicals include mono-, di- and tri-substituted organometalloid radicals of Group 14 elements wherein each of the hydrocarbyl groups contains from 1 to 20 carbon atoms. Examples of advantageous hydrocarbyl-substituted organometalloid radicals include trlmethylsilyl, triethylsilyl, ethyldimethylsilyl, methyldiethylsilyl, triphenylgermyl, and trimethylgermyl groups. Examples of Group 15 or 16 hetero atom containing moieties include amine, phosphine, ether or thioether moieties or monovalent derivatives thereof, e.g. amide, phosphide, ether or thioether groups bonded to the transition metal or Lanthanide metal, and bonded to the hydrocarbyl group or to the hydrocarbyl-substituted metalloid containing group. Examples of advantageous anionic, delocalized π-bonded groups include cyclopentadienyl, indenyl, fluorenyl, tetrahydroindenyl, tetrahydrofluorenyl, octahydrofluorenyl, pentadienyl, cyclohexadienyl, dihydroanthracenyl, hexahydroanthracenyl, and decahydroanthracenyl groups, as well as $C_{1-10}$ hydrocarbyl-substituted or $C_{1-10}$ hydrocarbyl-substituted silyl substituted derivatives thereof. Preferred anionic delocalized π-bonded groups are cyclopentadienyl, pentamethylcyclopentadienyl, tetramethylcyclopentadienyl, tetramethylsilylcyclopentadienyl, indenyl, 2,3-dimethylindenyl, fluorenyl, 2-methylindenyl, 2-methyl-4-phenylindenyl, tetrahydrofluorenyl, octahydrofluorenyl, and tetrahydroindenyl.

A preferred class of catalysts are transition metal complexes corresponding to the Formula A:

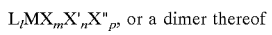

$L_lMX_mX'_nX''_p$, or a dimer thereof wherein:

L is an anionic, delocalized, π-bonded group that is bound to M, containing up to 50 non-hydrogen atoms, optionally two L groups may be joined together forming a bridged structure, and further optionally one L is bound to X;

M is a metal of Group 4 of the Periodic Table of the Elements in the +2, +3 or +4 formal oxidation state;

X is an optional, divalent substituent of up to 50 non-hydrogen atoms that together with L forms a metallocycle with M;

X' at each occurrence is an optional neutral Lewis base having up to 20 non-hydrogen atoms and optionally one X' and one L may be joined together;

X" each occurrence is a monovalent, anionic moiety having up to 40 non-hydrogen atoms, optionally, two X" groups are covalently bound together forming a divalent dianionic moiety having both valences bound to M, or, optionally 2 X" groups are covalently bound together to form a neutral, conjugated or nonconjugated diene that is π-bonded to M (whereupon M is in the +2 oxidation state), or further optionally one or more X" and one or more X' groups are bonded together thereby forming a moiety that is both covalently bound to M and coordinated thereto by means of Lewis base functionality;

l is 0, 1 or 2;

m is 0 or 1;

n is a number from 0 to 3;

p is an integer from 0 to 3; and the sum, l+m+p, is equal to the formal oxidation state of M, except when 2 X" groups together form a neutral conjugated or non-conjugated diene that is π-bonded to M, in which case the sum l+m is equal to the formal oxidation state of M.

Preferred complexes include those containing either one or two L groups. The latter complexes include those containing a bridging group linking the two L groups. Preferred bridging groups are those corresponding to the formula $(ER^*_2)_x$ wherein E is silicon, germanium, tin, or carbon, R* independently each occurrence is hydrogen or a group selected from silyl, hydrocarbyl, hydrocarbyloxy and combinations thereof, said R* having up to 30 carbon or silicon atoms, and x is 1 to 8. Preferably, R* independently each occurrence is methyl, ethyl, propyl, benzyl, tert-butyl, phenyl, methoxy, ethoxy or phenoxy.

Examples of the complexes containing two L groups are compounds corresponding to the formula:

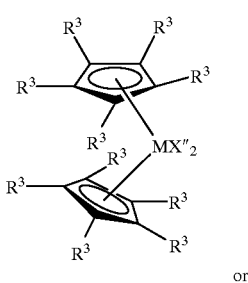

(AI)

or

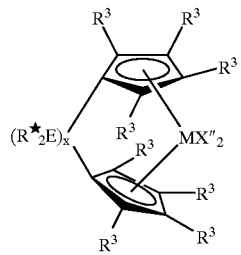

(AII)

wherein:

M is titanium, zirconium or hafnium, preferably zirconium or hafnium, in the +2 or +4 formal oxidation state;

$R^3$ in each occurrence independently is selected from the group consisting of hydrogen, hydrocarbyl, silyl, germyl, cyano, halo and combinations thereof, said $R^3$ having up to 20 non-hydrogen atoms, or adjacent $R^3$ groups together form a divalent derivative (e.g., a hydrocarbadiyl, germadiyl group) thereby forming a fused ring system, and X" independently each occurrence is an anionic ligand group of up to 40 non-hydrogen atoms, or two X" groups together form a divalent anionic ligand group of up to 40 non-hydrogen atoms or together are a conjugated diene having from 4 to 30 non-hydrogen atoms forming a-complex with M, whereupon M is in the +2 formal oxidation state, and R*, E and x are as previously defined.

The foregoing metal complexes are especially suited for the preparation of polymers having stereoregular molecular structure. In such capacity it is preferred that the complex possesses $C_s$ symmetry or possesses a chiral, stereorigid structure. Examples of the first type are compounds possessing different delocalized π-bonded systems, such as one cyclopentadienyl group and one fluorenyl group. Similar systems based on Ti(IV) or Zr(IV) were disclosed for preparation of syndiotactic olefin polymers in Ewen, et al., J. Am. Chem. Soc. 110, 6255–6256 (1980). Examples of chiral structures include rac bis-indenyl complexes. Similar systems based on Ti(IV) or Zr(IV) were disclosed for preparation of isotactic olefin polymers in Wild et al., J. Organomet. Chem., 232, 233–47,(1982).

To form the amorphous polypropylenes useful in the practice of the present invention it is preferred that the metal complex polymerizes the mentioned olefins regioselectively, but without stereoselectivity, thus producing an atactic (co) polymer. In such capacity it is preferred that the complex is obtained from metallocenes possessing $C_{2v}$ molecular symmetry and from achiral, meso isomers of ansa metallocenes; the catalyst complex is regiospecific and a stereospecific. Such catalysts are advantageously exemplified by catalysts having a structure corresponding to the preceding Formula A wherein there is one π-bonded group (l is 1 (one)) or corresponding to Formula AIII following. Exemplary bridged ligands containing two π-bonded groups are: (dimethylsilyl-bis(cyclopentadienyl)), (dimethylsilyl-bis(methylcyclopentadienyl)), (dimethylsilyl-bis(ethylcyclopentadienyl)), (dimethylsilyl-bis(t-butylcyclopentadienyl)), (dimethylsilyl-bis(tetramethylcyclopentadienyl)), (dimethylsilyl-bis(indenyl)), (dimethylsilyl-bis(tetrahydroindenyl)), (dimethylsilyl-bis(fluorenyl)), (dimethylsilyl-bis(tetrahydrofluorenyl)), (dimethylsilyl-bis(2-methyl-4-phenylindenyl)), (dimethylsilyl-bis(2-methylindenyl)), (dimethylsilyl-cyclopentadienyl-fluorenyl), (dimethylsilyl-cyclopentadienyl-octahydrofluorenyl), (dimethylsilylcyclopentadienyl-tetrahydrofluorenyl), (1,1,2,2-tetramethyl-1,2-disilyl-bis-cyclopentadienyl), (1,2-bis(cyclopentadienyl)ethane, and (isopropylidene-cyclopentadienyl-fluorenyl).

Preferred X" groups are selected from hydride, hydrocarbyl, silyl, germyl, halohydrocarbyl, halosilyl, silylhydrocarbyl and aminohydrocarbyl groups, or two X" groups together form a divalent derivative of a conjugated diene or else together they form a neutral, π-bonded, conjugated diene. Most preferred X" groups are $C_{1-20}$ hydrocarbyl groups, including those optionally formed from two X" groups together.

A further class of metal complexes corresponds to the preceding formula $L_lMX_mX'_nX''_p$, or a dimer thereof, wherein X is a divalent substituent of up to 50 non-hydrogen atoms that together with L forms a metallocycle with M. Preferred divalent X substituents include groups containing up to 30 non-hydrogen atoms comprising at least one atom that is oxygen, sulfur, boron or a member of Group 14 of the Periodic Table of the Elements directly attached to the delocalized π-bonded group, and a different atom, selected from the group consisting of nitrogen, phosphorus, oxygen or sulfur that is covalently bonded to M.

A preferred class of such Group 4 metal coordination complexes corresponds to the formula:

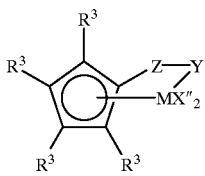

(AIII)

wherein:

M is titanium, zirconium or hafnium in the +2, +3 or +4 formal oxidation state;

X" and $R^3$ are as previously defined for formulas AI and AII;

Y is —O—, —S—, —NR*—, —NR*$_2$—, or —PR*—; and

Z is SiR*$_2$, CR*$_2$, SiR*$_2$SiR*$_2$, CR*$_2$CR*$_2$, CR*=CR*, CR*$_2$SiR*$_2$, or GeR*$_2$, wherein R* is as previously defined.

Illustrative Group 4 metal complexes that are optionally used as catalysts include: cyclopentadienyltitaniumtrimethyl, cyclopentadienyltitaniumtriethyl, cyclopentadienyltitaniumtriisopropyl, cyclopentadienyltitaniumtriphenyl, cyclopentadienyltitaniumtribenzyl, cyclopentadienyltitanium-2,4-dimethylpentadienyl, cyclopentadienyltitanium-2,4-dimethylpentadienyltriethylphosphine, cyclopentadienyltitanium-2,4-dimethylpentadienyltrimethylphosphine, cyclopentadienyltitaniumdimethylmethoxide, cyclopentadienyltitaniumdimethylchloride, pentamethylcyclopentadienyltitaniumtrimethyl, indenyltitaniumtrimethyl, indenyltitaniumtriethyl, indenyltitaniumtripropyl, indenyltitaniumtriphenyl, tetrahydroindenyltitaniumtribenzyl, pentamethylcyclopentadienyltitaniumtriisopropyl, pentamethylcyclopentadienyltitaniumtribenzyl, pentamethylcyclopentadienyltitaniumdimethylmethoxide, pentamethylcyclopentadienyltitaniumdimethylchloride, bis(η5-2,4-dimethylpentadienyl)titanium, bis(η5-2,4-dimethylpentadienyl)titaniumtrimethylphosphine, bis(η5-2,4-dimethylpentadienyl)titaniumtriethylphosphine, octahydrofluorenyltitaniumtrimethyl, tetrahydroindenyltitaniumtrimethyl, tetrahydrofluorenyltitaniumtrimethyl, (tert-butylamido)(1,1-dimethyl-2,3,4,9,10-1,4,η5,6,7,8-hexahydronaphthalenyl)dimethylsilanetitaniumdimethyl, (tert-butylamido)(1,1,2,3-tetramethyl-2,3,4,9,10-1,4,5,6,7,8-hexahydronaphthalenyl)dimethylsilanetitaniumdimethyl, (tert-butylamido)(tetramethyl-η5-cyclopentadienyl)dimethylsilanetitanium dibenzyl, (tert-butylamido)(tetramethyl-η5-cyclopentadienyl)dimethylsilanetitanium dimethyl, (tert-butylamido)(tetramethyl-η5-cyclopentadienyl)-1,2-ethanediyltitanium dimethyl, (tert-butylamido)(tetramethyl-η5-indenyl)dimethylsilanetitanium dimethyl, (tert-butylamido)(tetramethyl-η5-cyclopentadienyl)dimethylsilane titanium (III) 2-(dimethylamino)benzyl; (tert-butylamido)(tetramethyl-η5-cyclopentadienyl)dimethylsilanetitanium (III) allyl, (tert-butylamido)(tetramethyl-η5-cyclopentadienyl)dimethylsilanetitanium (III) 2,4-dimethylpentadienyl, (tert-butylamido)(tetramethyl-η5-cyclopentadienyl)dimethyl-silanetitanium (II) 1,4-diphenyl-1,3-butadiene, (tert-butylamido)(tetramethyl-η5-cyclopentadienyl)dimethyl-silanetitanium (II) 1,3-pentadiene, (tert-butylamido)(2-methylindenyl)dimethylsilanetitanium (II) 1,4-diphenyl-1,3-butadiene, (tert-butylamido)(2-methylindenyl)dimethylsilanetitanium (II) 2,4-hexadiene, (tert-butylamido)(2-methylindenyl)dimethylsilanetitanium (IV) 2,3-dimethyl-1,3-butadiene, (tert-butylamido)(2-methylindenyl)dimethylsilanetitanium (IV)isoprene, (tert-butylamido)(2-methylindenyl)dimethylsilanetitanium 1,3-butadiene, (tert-butylamido)(2,3-dimethylindenyl)dimethylsilanetitanium (IV) 2,3-dimethyl-1,3-butadiene, (tert-butylamido)(2,3-dimethylindenyl)dimethylsilanetitanium (IV) isoprene; (tert-butylamido)(2,3-dimethylindenyl)dimethylsilanetitanium (IV) dimethyl; (tert-butylamido)(2,3-dimethylindenyl)dimethylsilanetitanium (IV) dibenzyl; (tert-butylamido)(2,3-dimethylindenyl)dimethylsilanetitanium 1,3-butadiene,(tert-butylamido)(2,3-dimethylindenyl)dimethylsilanetitanium (II) 1,3-pentadiene, (tert-butylamido)(2,3-dimethylindenyl)dimethylsilanetitanium (II) 1,4-diphenyl-1,3-butadiene, (tert-butylamido)(2-methylindenyl)dimethylsilanetitanium (II) 1,3-pentadiene,(tert-butylamido)(2-methylindenyl)dimethylsilanetitanium (IV) dimethyl, (tert-butylamido)(2-methylindenyl)dimethylsilanetitanium (IV) dibenzyl, (tert-butylamido)(2-methyl-4-phenylindenyl)dimethylsilanetitanium (II) 1,4-diphenyl-1,3-butadiene, (tert-butylamido)(2-methyl-4-phenylindenyl)dimethylsilanetitanium (II) 1,3-pentadiene, (tert-butylamido)(2-methyl-4-phenylindenyl)dimethylsilanetitanium (II) 2,4-hexadiene, (tert-butylamido)(tetramethyl-η5-cyclopentadienyl)dimethyl-silanetitanium 1,3-butadiene, (tert-butylamido)(tetramethyl-η5-cyclopentadienyl)dimethyl-silanetitanium (IV) 2,3-dimethyl-1,3-butadiene, (tert-butylamido)(tetramethyl-η5-cyclopentadienyl)dimethyl-silanetitanium (IV) isoprene, (tert-butylamido)(tetramethyl-η5-cyclopentadienyl)dimethyl-silanetitanium (II) 1,4-dibenzyl-1,3-butadiene, (tert-butylamido)(tetramethyl-η5-cyclopentadienyl)dimethyl-silanetitanium (II) 2,4-hexadiene, (tert-butylamido)(tetramethyl-η5-cyclopentadienyl)dimethyl-silanetitanium (II) 3-methyl-1,3-pentadiene, (tert-butylamido)(2,4-dimethylpentadien-3-yl)dimethyl-silanetitaniumdimethyl, (tert-butylamido)(6,6-dimethylcyclohexadienyl)dimethyl-silanetitaniumdimethyl, (tert-butylamido)(1,1-dimethyl-2,3,4,9,10,1,4,5,6,7,8-hexahydronaphthalen-4-yl)dimethylsilanetitaniumdimethyl, (tert-butylamido)(1,1,2,3-tetramethyl-2,3,4,9,10,1,4,5,6,7,8-hexahydronaphthalen-4-yl) dimethylsilanetitaniumdimethyl(tert-butylamido) (tetramethyl-η5-cyclopentadienyl methylphenyl-silanetitanium (IV) dimethyl, (tert-butylamido)(tetramethyl-η5-cyclopentadienyl methylphenyl-silanetitanium (II) 1,4-diphenyl-1,3-butadiene, 1-(tert-butylamido)-2-(tetramethyl-η5-cyclopentadienyl)ethanediyl-titanium (IV) dimethyl, and 1-(tert-butylamido)-2-(tetramethylη5-cyclopentadienyl) ethanediyl-titanium (II) 1,4-diphenyl-1,3-butadiene.

Complexes containing two L groups including bridged complexes include: bis(cyclopentadienyl)zirconiumdimethyl, bis(cyclopentadienyl)zirconium dibenzyl, bis(cyclopentadienyl)zirconium methyl benzyl, bis(cyclopentadienyl)zirconium methyl phenyl, bis(cyclopentadienyl)zirconiumdiphenyl, bis(cyclopentadienyl)titanium-allyl, bis(cyclopentadienyl)zirconiummethylmnethoxide, bis(cyclopentadienyl)zirconiummethylchloride, bis(pentamethylcyclopentadienyl)zirconiumdimethyl, bis(pentamethylcyclopentadienyl)titaniumdimethyl, bis(indenyl)zirconiumdimethyl, bis(indenyl)zirconiummethyl (2-(dimethylamino)benzyl), bis(indenyl)zirconium methyltrimethylsilyl, bis(tetrahydroindenyl)zirconium methyltrimethylsilyl, bis(pentamethylcyclopentadienyl)zirconiummethylbenzyl, bis(pentamethylcyclopentadienyl)zirconiumdibenzyl, bis(pentamethylcyclopentadienyl)zirconiummethylmethoxide, bis(pentamethylcyclopentadienyl)zirconiummethylchloride, bis(methylethylcyclopentadienyl)zirconiumdimethyl, bis(butylcyclopentadienyl)zirconium dibenzyl, bis(t-butylcyclopentadienyl)zirconiumdimethyl, bis(ethyltetramethylcyclopentadienyl)zirconiumdimethyl, bis(methylpropylcyclopentadienyl)zirconium dibenzyl, bis(trimethylsilylcyclopentadienyl)zirconium dibenzyl, dimethylsilyl-bis(cyclopentadienyl)zirconiumdimethyl, dimethylsilyl-bis(tetramethylcyclopentadienyl)titanium-(III) allyl dimethylsilyl-bis(t-butylcyclopentadienyl) zirconiumdichloride, dimethylsilyl-bis(n-butylcyclopentadienyl)zirconiumdichloride, (methylene-bis(tetramethylcyclopentadienyl)titanium(III) 2-(dimethylamino)benzyl, (methylene-bis(n-butylcyclopentadienyl)titanium(III) 2-(dimethylamino) benzyl, dimethylsilyl-bis(indenyl)zirconiumbenzylchloride, dimethylsilyl-bis(2-methylindenyl)zirconiumdimethyl, dimethylsilyl-bis(2-methyl-4-phenylindenyl) zirconiumdimethyl, dimethylsilyl-bis(2-methylindenyl) zirconium-1,4-diphenyl-1,3-butadiene, dimethylsilyl-bis(2-methyl-4-phenylindenyl)zirconium (II) 1,4-diphenyl-1,3-butadiene, dimethylsilyl-bis(tetrahydroindenyl)zirconium (II) 1,4-diphenyl-1,3-butadiene, dimethylsilyl-bis(fluorenyl) zirconiummethylchloride, dimethylsilyl-bis(tetrahydrofluorenyl)zirconium bis(trimethylsilyl), and dimethylsilyl(tetramethylcyclopentadienyl)(fluorenyl) zirconium dimethyl.

Other catalysts, especially catalysts containing other Group 4 metals, will, of course, be apparent to those skilled in the art.

Preferred metallocene species include constrained geometry metal complexes, including titanium complexes, and methods for their preparation as are disclosed in U.S. application Ser. No. 545,403, filed Jul. 3, 1990 (EP-A-416,815); U.S. application Ser. No. 967,365, filed Oct. 28, 1992 (EP-A-514,828); and U.S. application Ser. No. 876,268, filed May 1, 1992, (EP-A-520,732), as well as U.S. Pat. Nos. 5,055,438, 5,057,475, 5,096,867, 5,064,802, 5,096,867, 5,132,380, 5,132,380, 5,470,993, 5,486,632 and 5,132,380, 5,321,106. The teachings of all the foregoing patents, publications and patent applications is hereby incorporated by reference in their entireties.

Metallocene catalysts are advantageously rendered catalytically active by combination with one or more activating cocatalysts, by use of an activating technique, or a combination thereof. Advantageous cocatalysts are those boron-containing cocatalysts within the skill in the art. Among the boron-containing cocatalysts are tri(hydrocarbyl)boron compounds and halogenated derivatives thereof, advantageously having from 1 to about 10 carbons in each hydrocarbyl or halogenated hydrocarbyl group, more especially perfluorinated tri(aryl)boron compounds, and most especially tris(pentafluorophenyl)borane); amine, phosphine, aliphatic alcohol and mercaptan adducts of halogenated tri($C_{1-10}$hydrocarbyl)boron compounds, especially such adducts of perfluorinated tri(aryl)boron compounds. Alternatively, the cocatalyst includes borates such as tetrapheny Borate having as counterions ammonium ions such as are within the skill in the art as illustrated by European Patent EP 672,688 (Canich, Exxon), published Sep. 20, 1995.

The cocatalyst can be used in combination with a tri (hydrocarbyl)aluminum compound having from 1 to 10 carbons in each hydrocarbyl group or an oligomeric or polymeric alumoxane. It is possible to employ these aluminum compounds for their beneficial ability to scavenge impurities such as oxygen, water, and aldehydes from the polymerization mixture. Preferred aluminum compounds include trialkyl aluminum compounds having from 2 to 6 carbons in each alkyl group, especially those wherein the alkyl groups are ethyl, propyl, isopropyl, n-butyl, isobutyl, pentyl, neopentyl, or isopentyl, and methylalumoxane, modified by methylalumoxane (that is methylalumoxane modified by reaction with triisobutyl aluminum) (MMAO) and diisobutylalumoxane. The molar ratio of aluminum compound to metal complex is preferably from 1:10,000 to 1000:1, more preferably from 1:5000 to 100:1, most preferably from 1:100 to 100:1. Cocatalysts are used in amounts and under conditions within the skill in the art. Their use is applicable to all processes within the skill in the art, including solution, slurry, bulk (especially propylene), and gas phase polymerization processed. Such processes include those fully disclosed in the references cited previously.

The molar ratio of catalyst/cocatalyst or activator employed preferably ranges from about 1:10,000 to about 100:1, more preferably from about 1:5000 to about 10:1, most preferably from about 1:1000 to about 1:1.

When utilizing such strong Lewis acid cocatalysts to polymerize higher α-olefins, especially propylene, it has been found especially desirable to also contact the catalyst/ cocatalyst mixture with a small quantity of ethylene or hydrogen (preferably at least one mole of ethylene or hydrogen per mole of metal complex, suitably from 1 to 100,000 moles of ethylene or hydrogen per mole of metal complex). This contacting may occur before, after or simultaneously to contacting with the higher -olefin. If the foregoing Lewis acid activated catalyst compositions are not treated in the foregoing manner, either extremely long induction periods are encountered or no polymerization at all results. The ethylene or hydrogen may be used in a suitably small quantity such that no significant affect on polymer properties is observed.

In most instances, the polymerization advantageously takes place at conditions known in the prior art for Ziegler-Natta or Kaminsky-Sinn type polymerization reactions, i.e., temperatures from 0–250° C. and pressures from atmospheric to 3000 atmospheres. Suspension, solution, slurry, gas phase or high pressure, whether employed in batch or continuous form or under other process conditions, including the recycling of condensed monomers or solvent, may be employed if desired. Examples of such processes are well known in the art for example, WO 88/02009-A1 or U.S. Pat. No. 5,084,534, disclose conditions that are advantageously employed with the polymerization catalysts and are incorporated herein by reference in their entireties. A support, especially silica, alumina, or a polymer (especially polytetrafluoroethylene or a polyolefin) is optionally employed, and desirably is employed when the catalysts are used in a gas phase polymerization process. Such supported catalysts are advantageously not affected by the presence of liquid aliphatic or aromatic hydrocarbons such as are optionally present under the use of condensation techniques in a gas phase polymerization process. Methods for the preparation of supported catalysts are disclosed in numerous references, examples of which are U.S. Pat. Nos. 4,808,561, 4,912,075, 5,008,228, 4,914,253, and 5,086,025 and are suitable for the preparation of supported catalysts.

In such a process the reactants and catalysts are optionally added to the solvent sequentially, in any order, or alternatively one or more of the reactants or catalyst system components are premixed with solvent or material preferably miscible therewith then mixed together or into more solvent optionally containing the other reactants or catalysts. The preferred process parameters are dependent on the monomers used and the polymer desired.

Propylene is added to the reaction vessel in predetermined amounts to achieve predetermined per ratios, advantageously in gaseous form using a joint mass flow controller. Alternatively propylene or other liquid monomers are added to the reaction vessel in amounts predetermined to result in ratios desired in the final product. They are optionally added together with the solvent (if any), alpha-olefin and functional comonomer, or alternatively added separately. The pressure in the reactor is a function of the temperature of the reaction mixture and the relative amounts of propylene and/or other monomers used in the reaction. Advantageously, the polymerization process is carried out at a pressure of from about 10 to about 1000 psi (70 to 7000 kPa), most preferably from about 140 to about 550 psi (980 to 3790 kPa). The polymerization is then conducted at a temperature of from 25 to 200° C., preferably from 50 to 100° C., and most preferably from 60 to 80° C.

The process is advantageously continuous, in which case the reactants are added continuously or at intervals and the catalyst and, optionally cocatalyst, are added as needed to maintain reaction and/or make up loss.

Solution polymerization or bulk polymerization is preferred. In the latter case liquid polypropylene is the reaction medium. Preferred solvents include mineral oils and the various hydrocarbons which are liquid at reaction temperatures. Illustrative examples of usefull solvents include straight- and branched-chain hydrocarbons such as alkanes, e.g. isobutane, butane, pentane, isopentane, hexane, heptane, octane and nonane, as well as mixtures of alkanes including kerosene and Isopar E, available from Exxon Chemicals Inc.; cyclic and alicyclic hydrocarbons such as cyclopentane, cyclohexane, methylcyclohexane, methylcycloheptane, and mixtures thereof; and aromatics and alkyl-substituted aromatic compounds such as benzene, toluene, xylenes, ethylbenzene, diethylbenzene, and the like; and perfluorinated hydrocarbons such as perfluorinated $C_4$–$C_{10}$ alkanes. Suitable solvents may include liquid olefins which may act as monomers or comonomers. Mixtures of the foregoing are also suitable.

At all times, the individual ingredients as well as the recovered catalyst components are protected from oxygen and moisture. Therefore, the catalyst components and catalysts are prepared and recovered in an oxygen- and moisture-free atmosphere. Preferably, therefore, the reactions are performed in the presence of a dry, inert gas such as, for example, nitrogen.

Without limiting in any way the scope of the invention, one means for carrying out such a polymerization process is as follows. In a stirred-tank reactor, olefin monomer is introduced continuously together with solvent and polyene monomer. The reactor contains a liquid phase composed substantially of monomers together with any solvent or additional diluent. Catalyst and cocatalyst are continuously introduced in the reactor liquid phase. The reactor temperature and pressure may be controlled by adjusting the solvent/monomer ratio, the catalyst addition rate, as well as by cooling or heating coils, jackets or both. The polymerization rate is controlled by the rate of catalyst addition. The polymer product molecular weight is controlled, optionally, by controlling other polymerization variables such as the temperature, monomer concentration, or by a stream of hydrogen introduced to the reactor, as is well known in the art. The reactor effluent is contacted with a catalyst kill agent such as water or an alcohol. The polymer solution is optionally heated, and the polymer product is recovered by flashing off gaseous monomers as well as residual solvent or diluent at reduced pressure, and, if necessary, conducting further devolatilization in equipment such as a devolatilizing extruder. In a continuous process, the mean residence time of the catalyst and polymer in the reactor generally is from about 5 minutes to 8 hours, and preferably from 10 minutes to 6 hours.

Preferably, the polymerization is conducted in a continuous solution polymerization system, optionally comprising more than one reactor connected in series or parallel.

The invention also includes a process of crystalline polypropylene polymerization in combination with or in sequence with amorphous polypropylene polymerization; using processes, within the skill in the art for producing amorphous, and syndiotactic or isotactic polymers, particularly to produce blends (preferably in-reactor blends) of the invention. Such use is within the skill in the art, for instance as illustrated by Canich in WO96/23838, Govoni et al in WO 96/02583, JP 8100016, EP 0436328 (Mitsui), EP 642536, Collina et al. in WO 96/11218, Welborne et al in EP 260130 and WO 87/02991 and Ueda et al. in EP 704462 and EP 704463, Buchelli et al. in WO 93/24533, Baker et al. in EP 704464, Sacchetti in WO 95/26369 Galli et al. in The Future Role of Ziegler-Natta Catalysts, Flexipole 96 conference paper, Houston, Tex., Jun. 26–28, 1996 and U.S. Pat. No. 5,541,260 (Ciarrocchi et al), U.S. Pat. No. 5,532,325 (Chiba Hiromasa, et al.), U.S. Pat. No. 5,543,478 (Hideto et al.), U.S. Pat. No. 4,701,432 (Welborn), and U.s. Pat. No. 5,548, 042 (Goode) which are incorporated herein by reference in their entireties.

The processes of the invention thus include multistage processes, which means that polymerization is carried out in two or more stages, in each of which polymerization occurs and which stages differ from one another in that at least one polymerization results in the crystalline polypropylene component, and at least one stage or polymerization results in the amorphous polypropylene component of the blends of the invention. A multistage reactor configuration optionally uses the same reactor for each stage; a part of a reactor for each stage; or one reactor per stage. In this specification, each stage is optionally referred to as a "reaction zone." Advantageously, two stages or reaction zones are used in the process. The stages or reaction zones are preferably connected in series. The cited references show that multistage processes are well within the skill in the art in the production of polyolefins. While the stages are preferably carried out in two or more hereinafter multiple) reactors, they optionally occur in one reactor wherein one or more catalysts, reaction conditions, or reactants are changed or used in sequence. For instance, a first catalyst is used until inactive, e.g. by being consumed, separated from reactants by polymer, or inactivated by addition of another material. Then a second catalyst is used. Alternatively, after a first catalyst is active in a polymerization, both the first and at least one subsequent catalyst are active simultaneously; for instance, at least one subsequent catalyst is added to a reaction mixture containing the first catalyst. It is within the skill in the art to stop and restart a polymerization by substantially stopping the reaction with or without the use of a deactivator, lower temperature, or deactivating a cocatalyst; preferably retaining the polymer particles in the reaction vessel without discharging them; and resuming the reaction e.g. by feeding an organoaluminum compound as cocatalyst to restart the polymerization, raising temperature to a temperature sufficient for polymerization, or addition of additional catalyst or monomer.

Multistage processes are particularly useful because of the possibility of independently varying, in any reactor or stage, process parameters to provide greater flexibility in controlling the composition and properties of the resulting polymer composition as compared with that obtained from a single-stage process.

"Reactor blend", as that term is used herein, means a highly dispersed blend of two or more components produced as a result of the formation of one polymer in the presence of another, an in situ blend produced by polymerizing one or more monomers in the presence of another polymer. The resulting reactor product is a highly dispersed blend of the various polymers.

Optionally the amorphous polypropylene is branched or coupled advantageously to provide higher melt strength in the film or sheet forming process. Optionally, additionally or alternatively the crystalline polypropylene is branched or coupled.

Branched crystalline polypropylene is commercially available for instance from Montell North America under the trade designations Profax PF-611 and PF-814. Alternatively, the branched or coupled forms of either of the polypropylenes are prepared by means within the skill in the art such as by peroxide or e-beam treatment, for instance as disclosed by DeNicola et al. in U.S. Pat. No. 5,414,027 (the use of high energy (ionizing) radiation in a reduced oxygen atmosphere); EP0190889 to Himont (electron beam irradiation of isotactic polypropylene at lower temperatures); U.S. Pat. No. 5,464,907 to Akzo Nobel NV, EP 754711 to Solvay (peroxide treatment).

In another embodiment, either or both of the polypropylenes are coupled. The term "coupled" is used herein to refer to polymers which are rheology-modified such that they exhibit change in the resistance of the molten polymer to flow. The resistance of polymer melts to flow is indicated by (1) the tensile stress growth coefficient and (2) the dynamic shear viscosity coefficient. The tensile stress growth coefficient $\eta E+$ is measured during start-up of uniaxial extensional flow by means within the skill in the art such as is described by J. Meissner in Proc. XIIth International Congress on Rheology, Quebec, Canada, August 1996, pages 7–10 and by J. Meissner and J. Hostettler, Rheol. Acta, 33, 1–21 (1994). The dynamic shear viscosity coefficient is measured with small-amplitude sinusoidal shear flow experiments by means within the skill in the art such as described by R. Hingmann and B. L. Marczinke, J. Rheol. 38(3), 573–87, 1994. Coupled polymers advantageously exhibit higher melt viscosities in shear and extensional flows as compared with linear polymer chains of the same absolute weight average molecular weight (Mw) and at the same temperature. Advantageously, their viscosities fall substantially to those of unmodified resins (starting materials before coupling reactions occur) for the easy flow required at high shear rates.

The polymers are optionally coupled by reactions with coupling agents, preferably coupling agents which do not form free radicals during the course of the coupling process, for instance coupling agents which insert into a C—H bond, such as an azide or diazo compound. The polypropylene is reacted with a chain coupling agent which is preferably a poly(sulfonyl)azide. When the poly(sulfonyl)azide reacts with the polymer, at least two polymer chains are advantageously joined and molecular weight of the polymer chain is increased. In the preferred case when the poly(sulfonyl azide) is a bis(sulfonyl azide), two polymer chains are advantageously joined.

The poly(sulfonyl azide) is any compound having at least two sulfonyl azide groups ($-SO_2N_3$) reactive with the polymer. Preferably the poly(sulfonyl azide)s have a structure X—R—X wherein each X is $SO_2N_3$ and R represents an unsubstituted or inertly substituted hydrocarbyl, hydrocarbyl ether or silicon-containing group, preferably having sufficient carbon, oxygen or silicon, preferably carbon, atoms to separate the sulfonyl azide groups sufficiently to permit a facile reaction between the polymer and the sulfonyl azide, more preferably at least 1, more preferably at least 2, most preferably at least 3 carbon, oxygen or silicon, preferably carbon, atoms between functional groups. While there is no critical limit to the length of R, each R advantageously has at least one carbon or silicon atom between X's and preferably has less than about 50, more preferably less than about 20, most preferably less than about 15 carbon, oxygen or silicon atoms. Silicon containing groups include silanes and siloxanes, preferably siloxanes. The term inertly substituted refers to substitution with atoms or groups which do not undesirably interfere with the desired reaction (s) or desired properties of the resulting coupled polymers. Such groups include fluorine, aliphatic or aromatic ether, siloxane as well as sulfonyl azide groups when more than two polymer chains are to be joined. R is suitably aryl, alky, aryl alkaryl, arylalkyl silane, siloxane or heterocyclic, groups and other groups which are inert and separate the sulfonyl azide groups as described. More preferably R includes at least one aryl group between the sulfonyl groups, most preferably at least two aryl groups (such as when R is 4,4' diphenylether or 4,4'-biphenyl). When R is one aryl group, it is preferred that the group have more than one ring, as in the case of naphthylene bis(sulfonyl azides). Poly (sulfonyl)azides include such compounds as 1,5-pentane bis(sulfonyl azide), 1,8-octane bis(sulfonyl azide), 1,10-decane bis(sulfonyl azide), 1,10-octadecane bis(sulfonyl azide), 1-octyl-2,4,6-benzene tris(sulfonyl azide), 4,4'-diphenyl ether bis(sulfonyl azide), 1,6-bis(4'-sulfonazidophenyl)hexane, 2,7-naphthalene bis(sulfonyl azide), and mixed sulfonyl azides of chlorinated aliphatic hydrocarbons containing an average of from 1 to 8 chlorine atoms and from about 2 to 5 sulfonyl azide groups per molecule, and mixtures thereof. Preferred poly(sulfonyl azide)s include oxy-bis(4-sulfonylazidobenzene), 2,7-naphthalene bis(sulfonyl azido), 4,4'-bis(sulfonyl azido) biphenyl, 4,4'-diphenyl ether bis(sulfonyl azide) and bis(4-sulfonyl azidophenyl)methane, and mixtures thereof.

Sulfonyl azides are conveniently prepared by the reaction of sodium azide with the corresponding sulfonyl chloride, although oxidation of sulfonyl hydazines with various reagents (nitrous acid, dinitrogen tetroxide, nitrosonium tetrafluoroborate) has been used.

Sulfonyl azides decompose in several ways, but for coupling, the reactive species is believed to advantageously be the singlet nitrene evidenced by insertion into C—H bonds. Thermal decomposition is reported to give an intermediate singlet sulfonyl nitrene, which will react readily by insertion into carbon-hydrogen bonds. Temperatures advantageous for efficient formation of the sulfonyl nitrene are usually greater than about 150° C. Sulfonyl azides also form another intermediate believed to be a triplet nitrene under conditions such as temperatures in excess of about 240° C. This intermediate leads to chain scission and is, therefore, preferably avoided in coupling.

The polymer(s) and coupling agent are suitably combined in any manner which results in desired reaction thereof, preferably by mixing the coupling agent with the polymer(s) under conditions which allow sufficient mixing before reaction to avoid uneven amounts of localized reaction then subjecting the resulting admixture to heat sufficient for reaction. Preferably, a substantially uniform admixture of coupling agent and polymer is formed before exposure to conditions in which chain coupling takes place. Mixing is preferably attained with the polymer in a molten or melted state, that is above the crystalline melt temperature, or in a dissolved or finely dispersed condition rather than in a solid mass or particulate form. The molten or melted form is more preferred to insure homogeniety rather than localized concentrations at the surface.

Any equipment is suitably used, preferably equipment which provides sufficient mixing and temperature control in the same equipment, but advantageously takes place in such devices as an extruder or a static polymer mixing devise such as a Brabender blender is used. The term extruder is used for its broadest meaning to include such devices as a device which extrudes pellets or pelletizer. Conveniently, when there is a melt extrusion step between production of the polymer and its use, at least one step of the process takes place in the melt extrusion step. Alternatively, the reaction takes place in a solvent or other medium, but it is preferred that the reaction be in a bulk phase to avoid later steps for removal of the solvent or other medium. For this purpose, a polymer above the crystalline melt temperature is advantageous for even mixing and for reaching a reaction temperature (the decomposition temperature of the sulfonyl azide).

In a preferred embodiment, the process takes place in a single vessel, that is mixing of the coupling agent and polymer takes place in the same vessel as heating to the decomposition temperature of the coupling agent. The vessel is preferably a twin-screw extruder, but is also advantageously a single-screw extruder or a batch mixer.

To couple, also referred to herein as "to modify rheology," the poly(sulfonyl azide) is used in a rheology modifying amount, that is an amount effective to increase the low-shear viscosity (at 0.1 rad/sec) of the polymer preferably at least about 5 percent as compared with the starting material polymer, but less than a crosslinking amount, that is an amount sufficient to result in at least about 10 weight percent gel as measured by ASTM D2765-procedure A. While those skilled in the art will recognize that the amount of azide sufficient to increase the low shear viscosity and result in less than about 10 weight percent gel will depend on molecular weight of the azide used and polymer the amount is preferably less than about 5 percent, more preferably less than about 2 percent, most preferably less than about 1 weight percent poly(sulfonyl azide) based on total weight of polymer when the poly(sulfonyl azide) has a molecular weight of from about 200 to about 2000. To achieve measurable rheology modification, the amount of poly(sulfonyl azide) is advantageously at least about 0.01 weight percent, preferably at least about 0.02 weight percent, more preferably at least about 0.05 weight percent, most preferably at least about 0.10 weight percent based on total polymer.

For rheology modification, the sulfonyl azide is admixed with the polymer and heated to at least the decomposition temperature of the sulfonyl azide. By decomposition temperature of the azide it is meant that temperature at which the azide converts to the sulfonyl nitrene, eliminating nitrogen and heat in the process, as determined by differential scanning calorimetry (DSC). The poly(sulfonyl azide)begins to react at a kinetically significant rate (convenient for use) at temperatures of about 130° C. and is almost completely reacted at about 160° C. in a DSC (scanning at 10° C./min). ARC (scanning at 2° C./hr) shows onset of decomposition is about 100° C.

Extent of reaction is a function of time and temperature. At the low levels of azide used, the optimal properties are not reached until the azide is essentially fully reacted. Temperatures for use in the process are also determined by the softening or melt temperatures of the polymer starting materials. For these reasons, the temperature is preferably greater than about 120° C., more preferably greater than about 150° C., most preferably greater than 180° C.

Preferred times at the desired decomposition temperatures are times that are sufficient to result in reaction of the coupling agent with the polymer(s) without undesirable thermal degradation of the polymer matrix. Preferred reaction times in terms of the half life of the coupling agent, that is the time required for about half of the agent to be reacted at a preselected temperature, which half life is determinable by DSC is about 5 half lives of the coupling agent. In the case of a bis(sulfonyl azide), for instance, the reaction time is preferably at least about 4 minutes at 200° C.

Whether or not the crystalline and/or amorphous polypropylenes are branched or coupled, they are blended to form blends of the invention. Blending is conveniently carried out by any means within the skill in the art such as a compounding operation, such as, for example, by single- and twin-screw extruders, Banbury mixers, Brabender mixers, Farrel continuous mixers, and two-roll mixers. The order of mixing and the form of the blend components to be mixed is not critical. Conveniently an amorphous polymer is prepared in a separate reactor from an isotactic propylene polymer and in parallel therewith, then the two polymers are blended. The mixing temperature is preferably such that an intimate blend is obtained of the components. Determining temperatures and other conditions is within the skill in the art. Typical temperatures are above the softening or melting points of at least one of the components, and more preferably above the softening or melting points of all the components. Further details are disclosed in U.S. application Ser. No. 09/133,576, filed Aug. 13, 1998 and U.S. application Ser. No. 09/133, 244, filed Aug. 13, 1998 which are hereby incorporated by reference herein in their entirety.

Alternatively, an amorphous polymer having increased melt strength by incorporating polyene monomers, preferably having at least about 7 carbon atoms into the propylene polymer chain, according to the procedure disclosed in U.S. application Ser. No. 09/064,672, filed Apr. 23, 1998 which is hereby incorporated by reference herein in its entirety. The amorphous propylene polymer is prepared by polymerization with a single site catalyst suitable for forming atactic polymer chains, preferably a metallocene or constrained geometry catalyst. The polymerization process is that previously described for preparation of amorphous propylene polymers herein. The polyene preferably has sufficient chain length to avoid unnecessary intrachain ring formation and achieve predominantly H-type-branching, more preferably having at least about 7 carbon atoms, which polyene is most preferably linear but optionally has branches of from 1 to about 10 carbon atoms, such as 1,8-nonadiene, 1,9-decadiene, divinylbenzene, divinylsilane, or more preferably 1,9-decadiene. Presence of the polyene advantageously increases the ratio of the shear viscosity measured at low shear rate (1 Hz) divided by the shear viscosity measured at high shear rate (100 Hz) over that of the pure homopolymer or copolymer formed in the same process, or as a component of a corresponding blend with other polyolefins. In this way the melt strength (important at low shear rates) is improved while good processability (lower shear viscosity at high shear rate) is maintained. This improves the output rate in e.g. film production processes for packaging applications while also improving the performance (mechanical strength) of the film. Other potential applications processes include blow molding, thermoforming, injection molding and general extrusion processes.

Examples of the straight-chain or branched acyclic diene compounds which are preferred polyenes include 1,6-heptadiene, 1,7-octadiene, 1,8-nonadiene, 1,9-decadiene, 1,11-dodecadiene, 1,13-tetradecadiene, and lower alkyl substituted derivatives thereof; examples of the monocyclic alicyclic diene compounds include 1,3-divinylcyclopentane, 1,2-divinylcyclohexane, 1,3-divinylcyclohexane, 1,4-divinylcyclohexane, 1,5-divinylcyclooctane, 1-allyl-4-vinylcyclohexane, 1,4-diallylcyclohexane, 1-allyl-5-vinylcyclooctane, 1,5-diallylcyclooctane, and lower alkyl substituted derivatives thereof. Other suitable polyenes include bicylco-(2,2,1)-hepta-2,5-diene (norbornadiene), the dimer of norbornadiene, and diolefins having two strained ring double bonds, such as the reaction product obtained by reacting 2,5-norbornadiene with cyclopentadienyl-1,4,4a,5,8,8a-hexahydro-1,4,5,8-dimethano-naphtalene, and combinations thereof. Compounds similar but resulting from the addition of more bridged ring units by further condensation with such ring compounds as cyclopentadiene can also be used.

Preferably the polyene is a diene, advantageously an aliphatic diene, preferably having an olefinlc double bond at both terminals, in other words an α-ω-diene, containing from about 8 to about 18 carbon atoms. More preferably, the polyene is an aliphatic α-ω-diene containing from about 10 to about 18 carbon atoms. Interpolymers containing units derived from 1,9-decadiene are highly preferred. Highly preferred are interpolymers comprising units derived from propylene, optionally and more preferably with another α-olefin with from 2 to about 12 carbon atoms, preferably from 2 to about 8 carbon atoms, and from 1,9-decadiene.

The polyene and propylene, optionally with other alpha olefins, are polymerized in a mole ratio from about 0.00005, preferably about 0.005, more probably 0.007 to about 0.3, preferably about 0.1 mole of the polyene per mole of olefin (including propylene). Advantageous polyene contents in the interpolymer range from about 0.005, preferably 0.007 mole percent, more preferably about 0.01 to preferably about 0.10, more preferably about 0.70, even more preferably, 0.05 most preferably 0.2 mole percent. For the highly preferred interpolymers containing 1,9-decadiene units, the preferred polyene content is from about 0.02 to about 0.1, more preferably 0.01 about 0.05 mole percent. The polyene content can be determined by solution 13C NMR for those interpolymers not containing other monomers that may interfere with the determination.

The blends of the present invention optionally further comprise additives or adjuvants which are advantageously added to olefin-based polymers, such as fillers, antioxidants, colorants, UV stabilizers, flame retardants, etc. which are within the skill in the art.

Blend ratios of 1 to 15 weight percent amorphous polypropylene and 99 to 85 weight percent of crystalline polypropylene are preferred, more preferred are ratios of 1 to 10 weight percent amorphous polypropylene and 99 to 90 weight percent crystalline polypropylene, most preferred are blends of 1 to 5 weight percent amorphous polypropylene and 99 to 95 weight percent crystalline polypropylene. At higher concentrations of amorphous polypropylene, the mechanical properties such as tensile modulus are negatively affected.

The blends of the present invention or their blend compositions are optionally used to fabricate articles, such as films, sheet, moldings, and other shaped articles by conventional processes, preferably under melt processing conditions. Suitable processes include blow molding, extrusion, extrusion blow molding and thermoforming. The present blends can also be functionalized or grafted using to methods and techniques within the skill in the art.

Blends of the invention are optionally and advantageously reacted with coupling agents in the manner described for reaction with either component of the blend. Coupling in the blend is preferably used when neither component is coupled or branched, but is alternatively used when more coupling is desirable than is evident from coupling or branching of one or more components separately.

Descriptions of forming processes are disclosed in E. Moore, "Propylene Handbook", Hanser Publishers, 1996. For illustration, useful processes include the following: In Bi-axially Oriented Polypropylene film manufacturing (BOPP) using the tenter frame orientation process, four distinctive sections can be identified: Extrusion+M(achine) D(irection) O(rientation)+T(ransverse) D(irection) O(rientation)+Film Winding. The extrusion part consists of a screw to melt and transport molten polymer into a slot die. The molten sheet is cooled onto a chill roll. The cooled film is guided over a section of the roll of which part of them are heated and rotate at different speeds to induce a uniaxial Machine Direction Orientation (MDO). The stretched film is guided into a tenter frame where the film is stretched in the Transverse Direction Orientation (TDO) to produce the desired film thickness. The film is edge trnmed and wound up on a roll for further processing. The number of extruders is usually three or more to produce multi-layer coextruded sheet or film. For thermoforming the first step in the process is the same: a cast sheet extrusion. This is followed by a reheating of the sheet followed by a forging process in or on a mold. Extrusion Blow molding, consists of an extrusion set-up where the die can have a complex annular configuration. The die can move with respect to the core or mandrel to control the die gap and the final parison thickness. The parison is enclosed into a cooled mold and inflated. Many different die heads and ways of producing bottles or containers exist. Extrusion blown film is a process where the extruder is connected to an annular die head. The tube of molten polymer is pulled and closed by way of nip rolls. The tube is blown up to achieve a specified blow up ratio which determines the MD and TD orientation balance.

For applications in blow molding, extrusion, extrusion blow molding, injection blow molding and thermoforming, and the like and combinations thereof the time between the melt leaving the die and crystallization, is the time available for stretching. This time span is determined mainly by the crystallization rate of the material. Blends of the invention have reduced crystallization rate as compared to the crystalline polypropylene component alone and are, therefore, advantageous when stretching or conforming to a mold or other shaping is desired.

The following examples are to illustrate this invention and do not limit it. Ratios, parts, and percentages are by weight unless otherwise stated. Examples (Ex) of the invention are designated numerically while comparative samples (C.S.) are designated alphabetically and are not examples of the invention.

The amorphous polypropylene (designated aPP-1) prepared using a single site catalyst, used in Ex. 1 and 2, was prepared in the following way: A continuous stirred tank reactor with a volume of 23 liters was used. A propylene flow of 7 lbs/hr (3.2 kg/hr) and a ethylene flow of 0.15 lbs/hr (0.07 kg/hr) were combined before being introduced into a diluent mixture of C8–C10 saturated hydrocarbons commercially available from Exxon Chemical under the trade designation Isopar E, referred to hereinafter as solvent. That three component admixture is referred to hereinafter as reactor feed. The propylene and ethylene were purified by passing them through silica and alumina molecular sieves before introduction into the reactor. The reactor feed mixture was continuously introduced to the reactor. The transition metal complex and the cocatalyst, dissolved in the same solvent, were combined into a single stream and were also continuously injected into the reactor. The reactor pressure was held constant at about 30 bar (3000 kPa). The reactor temperature was controlled by the catalyst flow and by the use of a cooling jacket at about 65° C. The outlet stream of the reactor was taken to a heat exchanger where its temperature was raised to 270° C. and then to a devolatilizing unit where the solvent was separated from the polymer. The molten polymer was then carried to a pelletizer. The polymer production rate was 3 lbs/hr (1.4 =kg/hr).

The catalyst system used was {(tert-butylamido)dimethyl (tetramethyl-η5-cyclopentadienyl)silane} titanium (II) 1,3-pentadiene, the titanium being in the formal +2 oxidation state, with tris(pentafluorophenyl) borane as cocatalyst at a molar ratio of catalyst to cocatalyst to isobutyl-modified methylalumoxane of 1:3:9. All materials other than the catalyst are commercially available. The Group IV metal complex catalyst was prepared as disclosed by Devore et al. in U. S. Pat. Nos. 5,470,993 and 5,556,928; and U.S. Pat. No. 5,512,693 by Rosen et al. which patents are incorporated by reference herein in their entireties.

The catalyst efficiency as calculated from the measurement of the conversion of the monomers by calculating the ratio of (weight of polymer produced/hour)/(weight of monomers fed to the reactor/hour) was 43%.

The amorphous polypropylene (hereinafter aPP-2) prepared using Ziegler-Natta catalyst, used in C.S. B and D, was obtained from Sigma-Aldrich, Inc. and represents a typical amorphous polypropylene made using Ziegler-Natta catalyst. The Melt Flow Rate, GPC molecular weight, Comonomer content and DSC glass transition temperature and heat of fusion of the two different amorphous polypropylenes are listed in Table 1. Amorphous polypropylene made using Ziegler-Natta catalyst is not found to be available with properties comparable to those of amorphous polypropylene made using single site catalysts.

TABLE 1

Molecular properties of single site catalyzed and comparative Ziegler-Natta catalyzed samples of amorphous polypropylene

| Amorphous poly-propylene | MFR 230° C./ 2.16 kg (g/10 min) | GPC Molecular weight | | | Conc. comonomer in polymer (wt %) | DSC | |
|---|---|---|---|---|---|---|---|
| | | Mn (g/mol) | Mw (g/mol) | MWD | | Tg (° C.) | ΔHf (J/g) |
| aPP-1 | 9 | 94200 | 197700 | 2.1 | 4.3 (ethylene) | −7.5 | 0 |
| aPP-2 | * | 5800 | 32700 | 5.7 | 0 | −5.7 | 17.1 | wt % means weight percent.

MFR is melt flow rate as determined by ASTM-D-1238-95 at 230° C./2.16 kg. * The MFR of sample aPP-2 was too high to be measured under the described conditions.

MWD is Mw/Mn as measured by GPC (gel permeation chromatography).

The glass transition temperature (Tg) and the heat of fusion (ΔHf) are measured by DSC (dynamic scanning calorimetry) at a heating rate of 10° C./min.

EXAMPLES 1–2 AND COMPARATIVE SAMPLE BLENDS A–D

Blends of isotactic and single site catalyzed amorphous polypropylene in Examples 1 and 2 contrasted with Ziegler-Natta catalyzed amorphous polypropylene for Comparative Sample Blend B and D Blends of these amorphous polypropylenes (aPP-1 and aPP-2), and crystalline polypropylenes are prepared by extrusion in the concentration range of 1–15 weight percent amorphous polypropylene and 99–85 weight percent crystalline polypropylene (as indicated in Table 2). The crystalline polypropylenes used are commercially available from Montell Technology Company B.V. under the trade designations Profax™ 6523 (MFR=4.0 g/10 min; designated herein iPP-A) and Moplen™ S38F (MFR=2.0 g/10 min; designated herein iPP-B). During blending 1000 ppm of a phenolic-type anti-oxidant commercially available from Ciba Geigy Corporation under the trade designation Irganox™ 1010 and 1000 ppm of a phosphite-type anti-oxidant commercially available from Ciba Geigy Corporation under the trade designation Irgafos™ 168 are added to each blend.

Table 3 gives an overview of the relative crystallization rates, the relative overall elongation after stretching and the relative stress during stretching for the blends prepared with iPP-A. Table 4 gives the relative crystallization rate, the relative overall elongation after stretching, the relative stress during stretching and the relative tear strength of stretched films for the blends prepared with iPP-B.

The difference if the onset temperature of crystallization and the peak temperature of crystallization, as determined by dynamic scanning calorimetry (DSC), is used as an indicator for the crystallization rate (heating rate 10° C./min).

All blends were processed in two ways, namely using sequential machine direction and transverse direction stretching and using simultaneous biaxial stretching.

Sequential stretching was done on a small lab Machine Direction Orientation (MDO) line, followed by stretching in the transverse direction. The blends were extruded at a temperature of 210° C into a small tape (4 cm), which was stretched between slow rolls (9 m/min) and fast. rolls (18–90 m/min) after exiting the die. Specimens measuring 50×10 mm of the monoaxially stretched films were stretched in the transverse direction using an Instron tensile tester at 100° C. at 100 mm/min (according to the procedure of ASTM D638, Type V specimens).

For the simultaneous biaxial stretching, sheets were compression molded from the blends at 205° C. Squares measuring 10 cm×10 cm were cut from the sheets and loaded into a biaxial film stretcher commercially available from Iwamoto Seisakusho Company Ltd. under the trade designation Iwamoto BIX-3. The squares were stretched in the synchrous biaxial mode to a final draw ratio of 6×6. During stretching load-displacement data were gathered. In Table 3 and 4 the relative engineering stress during stretching is reported for an elongation (λ) of 4.

The tear strength of the films produced using simultaneous biaxial stretching was measured in the following way. The tear strength tests were performed using a test frame commercially available from Instron Corp. under the trade designation Instron 4505 equipped with a 112 lbf (51 kg force) full scale load cell and operating under the control of software commercially available from Instron Corp. under the trade designation Instron Series IX Automated Materials Testing System software. Tear specimens were single-edge notched rectangular strips measuring 3"×0.5" (0.08×0.01 m). These were tested by pulling at a crosshead speed of 2 inches per minute (0.5 m/min). Notch lengths was 0.15" (0.0038 m). Stress intensity factors K were calculated as:

$$K = \frac{1.12\pi^{1/2}a^{1/2}p_{max}}{(W-a)t}$$

where W and t are the width and thickness of the strip, a is the crack length, and pmax is the maximum load. Fracture energies J* were calculated as:

$$J^* = \frac{U}{(W-a)t}$$

where U is the total energy under the loading curve. Average values of 5 samples are reported. In the single-edge notch tear test, toughness increases slightly with decrease in notch length.

TABLE 2

Composition of blends of isotactic and amorphous polypropylene

| Example | Isotactic PP | Amorphous PP | Ratio iPP/aPP |
| --- | --- | --- | --- |
| C.S. A | iPP-A | none | 100/0 |
| Ex. 1 | iPP-A | aPP-1 | 90/10 |
| C.S. B | iPP-A | aPP-2 | 90/10 |
| C.S. C | iPP-B | none | 100/0 |
| Ex. 2 | iPP-B | aPP-1 | 85/15 |
| C.S. D | iPP-B | aPP-2 | 85/15 |

TABLE 3

Relative crystallization rate, overall elongation and stress during stretching for blends containing iPP-A and amorphous polypropylene

| Example | Relative Cryst. rate | Crystallinity (%) | Overall elongation | Stress during stretching |
| --- | --- | --- | --- | --- |
| C.S. A | 1.0 | 100 | 1.0 | 1.00 |
| Ex. 1 | 2.4 | 93.2 | 5.4 | — |
| C.S. B | 2.1 | 86.5 | 5.2 | 0.88 |

(- = not measured)

TABLE 4

Relative crystallization rate, overall elongation, stress during stretching, and tear strength for blends containing iPP-B and amorphous polypropylene

| Example | Relative Cryst. rate | Crystallinity (%) | Overall elongation | Stress during stretching | Tear strength K | J* |
| --- | --- | --- | --- | --- | --- | --- |
| C.S. C | 1.0 | 100 | 1.0 | 1.00 | 1.00 | 1.00 |
| Ex. 2 | 2.0 | 90.6 | 4.6 | 0.87 | 0.87 | 0.82 |
| C.S. D | 1.2 | — | 5.0 | — | 0.76 | 0.68 |

(- = not measured)

The data in Tables 3 and 4 show that blending crystalline polypropylene with amorphous polypropylene according to the practice of the invention, results in a composition having a reduced crystallization rate of the blend as compared with the crystalline polypropylene alone. Furthermore, the blend of the invention can be stretched to a higher overall elongation, which leads to higher output rates as compared with the crystalline polypropylene alone. Alternatively, at a fixed elongation, the blends of the invention can be stretched at lower stress during stretching. Since the stress during stretching is lower, fewer breaks of the film occur during the stretching process, and the final stress in the product is lower as well, leading to a longer expected lifetime of the product. Also, compared to the blend with Ziegler-Natta catalyzed amorphous polypropylene (aPP-2), the crystallinity of the blend with single site catalyzed amorphous polypropylene (aPP-1) is higher at the same content of amorphous polypropylene in the blend. A higher level of crystallinity will give better mechanical properties such as tensile modulus and tear strength.

The tear strength expressed as the stress intensity factor K (or the fracture energy J*) of the stretched films of the blends of crystalline and amorphous polypropylene prepared by single site catalysis is reduced by 13% (18%) compared to the tear strength of stretched films of crystalline polypropylene. In contrast, the Comparative Sample Blend D with amorphous polypropylene prepared by Ziegler-Natta chemistry, exhibits a decrease in tear strength of 24% (32%), higher than the decrease in tear strength for the examples of the invention due to the lower molecular weight and the broader molecular weight distribution of the Ziegler-Natta catalyst based amorphous polypropylene.

Reduced crystallization rate which is an advantage for the stretching processes such as BOPP, blow molding and thermoforming is advantageously observed in the practice of the invention.

What is claimed is:

1. A blend composition comprising (a) from about 1 to about 15 weight percent of amorphous polypropylene (b) from about 99 to about 85 weight percent of crystalline polypropylene, wherein the molecular weight of the amorphous polypropylene is lower than the molecular weight of the crystalline polypropylene; the molecular weight (Mw) of the amorphous polypropylene is greater than about 50,000 g/mole; the amorphous polypropylene has a MWD less than about 3; and wherein the percentages are based on total amorphous plus crystalline polypropylene.

2. The composition of claim 1 wherein the amorphous polypropylene has a glass transition temperature greater than about −10° C. and both the amorphous and crystalline polypropylenes are polymers with at least about 90 mole percent of their repeating units derived from propylene.

3. The composition of claim 1 wherein at least one of the crystalline polypropylene or amorphous polypropylene is propylene polymerized with one or more other monomers addition polymerizable with propylene.

4. The composition of claim 3 wherein at least one other monomer is selected from the group consisting of 7-methyl-1,6-octadiene, 3,7-dimethyl-1,6-octadiene, 5,7-dimethyl-1,6-octadiene, 3,7,11-trimethyl-1,6,10-octatriene, 6-methyl-1,5-heptadiene, 1,3-butadiene, 1,6-heptadiene, 1,7-octadiene, 1,8-nonadiene, 1,9-decadiene, 1,10-undecadiene, norbornene, tetracyclododecene, or mixtures thereof, preferably butadiene, hexadienes, and octadienes, most preferably 1,4-hexadiene, 1,9-decadiene, 4-methyl-1,4-hexadiene, 5-methyl-1,4-hexadiene, dicyclopentadiene, and 5-ethylidene-2-norbornene.

5. The composition of claim 1 wherein the molecular weight (Mw) of the amorphous polypropylene is greater than about 100,000 g/mole.

6. The composition of claim 5 wherein the crystalline polypropylene is prepared using a single site catalyst.

7. The composition of claim 5 wherein the crystalline polypropylene has a weight average molecular weight as measured by gel permeation chromatography (GPC) greater than about 150,000.

8. The composition of claim 7 wherein the crystalline polypropylene has a weight average molecular weight greater than about 300,000 g/mole.

9. The composition of claim 5 wherein the amorphous polypropylene has a weight average molecular weight (Mw) greater than about 150,000 g/mole.

10. The composition of claim 5 wherein the amorphous polypropylene has a weight average molecular weight (Mw) less than that of the crystalline polypropylene by at least about 10 percent or by least about 50,000 g/mole.

11. The composition of claim 5 wherein the amorphous polypropylene is branched or coupled.

12. The composition of claim 5 wherein the crystalline polypropylene is branched or coupled.

13. A multistage process comprising out in two or more stages, in each of which polymerization occurs and which stages differ from one another in that at least one polymerization results in the crystalline polypropylene component, and at least one stage or polymerization results in the amorphous polypropylene component of the composition of claim 1.

14. A process comprising blow molding, extruding, extrusion blow molding, injection blow molding or thermoforming a composition of claim 1.

15. A process comprising reacting a composition of claim 1 with a coupling agent.

16. A film comprising a composition of claim 1.

17. The film of claim 16 wherein the film exhibits at least one of reduced crystallization rate of the blend, reduced stress during stretching, fewer breaks of the film during the stretching process, greater tear strength or lower final stress in the film as compared with a film formed from the crystalline polypropylene alone or blended with the same amount of an amorphous polypropylene which has a molecular weight less than 30,000 g/mole or greater than that of the crystalline polypropylene.

18. A sheet, foam, article or fiber comprising a composition of claim 1.

19. The article of claim 18 which is a molded article.

20. The article of claim 19 which comprises a blow molded, injection blow molded, extruded or extrusion blow molded article.

* * * * *